United States Patent [19]

Nicholson

[11] 4,435,891
[45] Mar. 13, 1984

[54] METHOD OF MANUFACTURING A SANITARY FAN SPRAY NOZZLE

[75] Inventor: Charles B. Nicholson, Glens Falls, N.Y.

[73] Assignee: Albany International Corporation, Menands, N.Y.

[21] Appl. No.: 435,360

[22] Filed: Oct. 20, 1982

Related U.S. Application Data

[62] Division of Ser. No. 235,895, Feb. 19, 1981, abandoned.

[51] Int. Cl.³ .................... B23P 15/00; B23P 13/00
[52] U.S. Cl. ........................ 29/157 C; 29/163.5 R; 29/558; 239/566; 239/597
[58] Field of Search ............ 29/157 C, 163.5 R, 558; 239/597, 601, 566–568, 548

[56] References Cited

U.S. PATENT DOCUMENTS

| | | | |
|---|---|---|---|
| 169,355 | 11/1875 | Grinnell | 239/601 |
| 1,685,287 | 9/1928 | McEvoy, Jr. | 29/163.5 R |
| 2,774,631 | 12/1956 | Wahlin | 29/157 C |
| 2,834,635 | 5/1958 | Miller | 239/601 |
| 2,971,250 | 2/1961 | Wahlin | 29/157 C |
| 3,647,147 | 3/1972 | Cook | 239/601 |
| 3,737,108 | 6/1973 | Stumphauzer et al. | 239/601 |
| 3,827,637 | 8/1974 | Stephany et al. | 239/566 |
| 4,069,978 | 1/1978 | El Moussa | 29/157 C |
| 4,161,873 | 7/1979 | Mabery | 29/157 C |

Primary Examiner—Daniel C. Crane
Attorney, Agent, or Firm—Kane, Dalsimer, Kane, Sullivan and Kurucz

[57] ABSTRACT

A sanitary fan spray nozzle is disclosed together with its method of manufacture. The nozzle includes a passage extending from the interior surface of the tube to an exterior surface thereof. The passage has a relatively large diameter for a portion thereof between the interior surface of the tube and a point within the tube walls. The passage then narrows and is intersected by an arcuate groove having a lengthwise dimension which is substantially parallel to the longitudinal axis of the tube. The width of the arcuate groove is smaller than the diameter of the larger portion of the passage. The nozzle is formed by a method which includes drilling a pair of diametrically opposed small pilot holes through the tube, drilling completely through one of the pilot holes and a portion of the opposing hole with the bit having a larger diameter than the pilot holes. An arcuate groove is then cut within the exterior surface of the tube. The opposite hole is later plugged.

2 Claims, 8 Drawing Figures

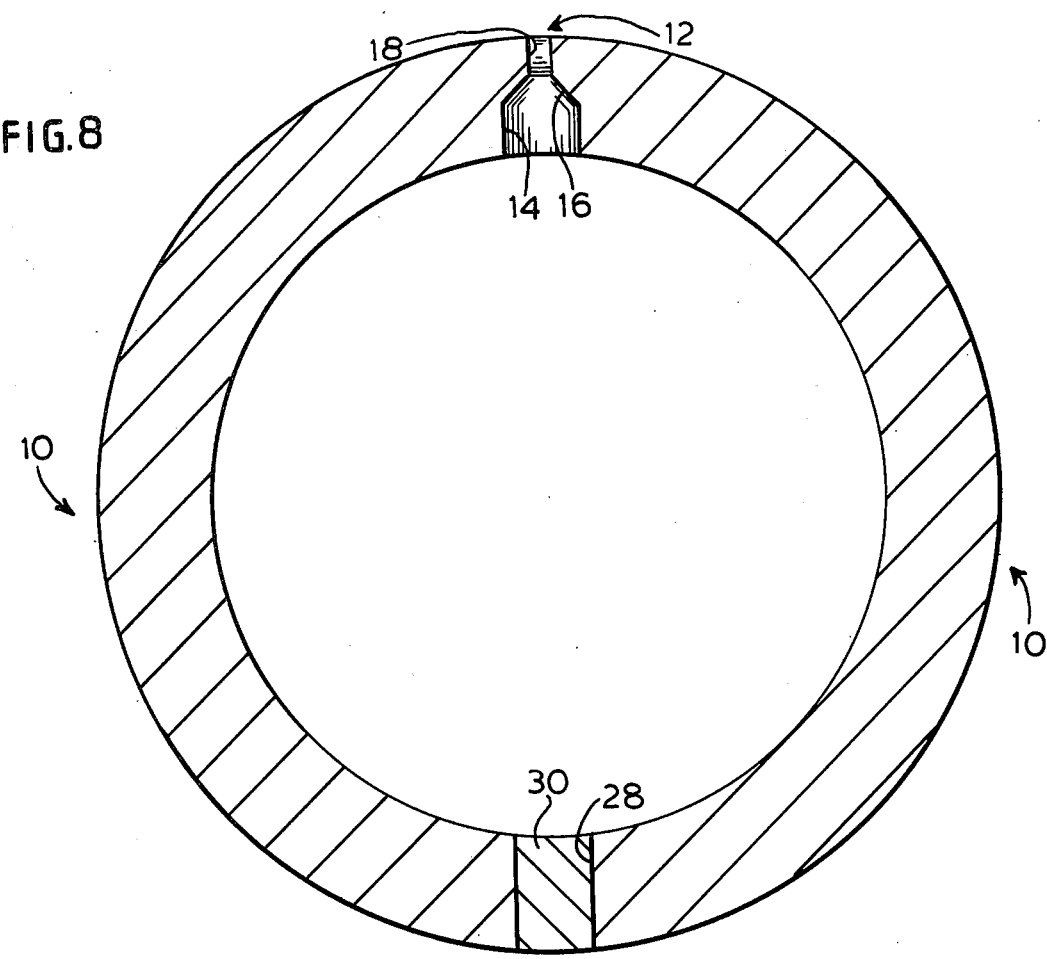
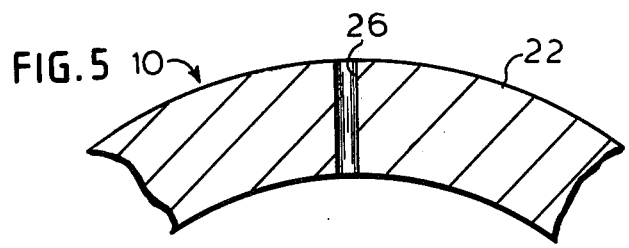
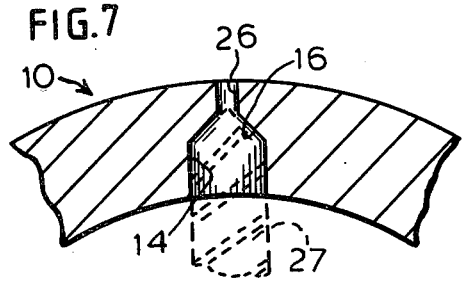
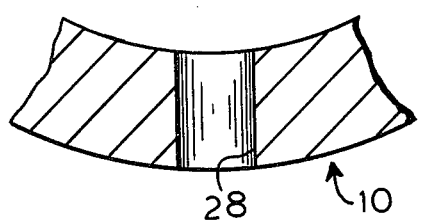
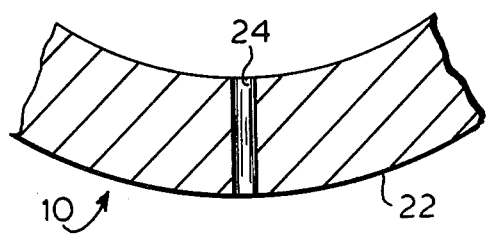

METHOD OF MANUFACTURING A SANITARY FAN SPRAY NOZZLE

This is a division of application Ser. No. 235,895, filed Feb. 19, 1981, now abandoned.

BACKGROUND OF THE INVENTION

The field of the invention relates to spray nozzles used in conjunction with a pipe or tube that serves as a water header.

Spray openings have been machined in the wall of a water header, but they have not resulted in a well defined spray pattern. To generate a good spray pattern, machining has been done in a flat disc that is subsequently attached to a tube by means of soldering, welding, or threads.

Spray nozzles of the above-mentioned types are about by way of example in U.S. Pat. Nos. 169,355, 1,151,958, 2,834,635, and 3,647,147.

In such areas as the food industry, there can be so void areas such as small threads where bacteria may grow. For this reason multiple drilled holes have been employed because they form a smooth transition with the interior of the water header. Such holes do not, however, produce a superior spray pattern.

SUMMARY OF THE INVENTION

The invention provides a fan spray nozzle which is machined in the wall of a water header. The geometry of the nozzle is such that a desirable spray pattern is obtained. A method is also provided for forming the nozzle opening in an efficient manner. The nozzle provided herein has potential utility within a cheese filter, but other uses are also contemplated.

The method for producing the spray opening according to the invention first involves the drilling of a small hole through opposite sides of a tube. A pair of coaxial holes are accordingly formed, the respective axes of the holes passing through the longitudinal axis of the tube.

A larger drill bit is then employed for drilling along the axes of the opposing small holes. A relatively large first hole is drilled entirely through one small hole. The bit then proceeds through the interior of the tube whereupon it contacts the interior opening of the opposite or second hole. It penetrates the tube wall thereby enlarging the relatively small opposite hole over a portion thereof. The drilling operation is stopped before the bit penetrates the opposite exterior wall of the tube.

An arcuate groove is machined along the exterior wall of the tube. The groove has a length extending parallel to the longitudinal axis of the tube and intersects the above-described second hole. Its width should be smaller than the diameter of the portion of the hole formed by the larger drill bit. The second hole bisects the length of the arcuate groove and accordingly has an opening at the deepest point thereof.

The first hole is plugged or otherwise closed so that the walls of the tube are of uniform thickness opposite the second hole.

The fan spray nozzle according to the invention includes a relatively large substantially circular hole extending from the interior surface of a tube to a point within the tube wall. A similar hole extends axially from the larger hole and has an opening defined by an exterior surface of the tube. This exterior opening is positioned at the deepest point of an arcuate groove formed within the exterior surface of the tube. The groove has a longitudinal dimension which is parallel to the longitudinal axis of the tube. Its width is smaller than the diameter of the larger hole portion.

BRIEF DESCRIPTION OF THE DRAWINGS

FIG. 4 is a sectional view of one side of a tube having a relatively small hole drilled therein;

FIG. 5 is a sectional view of the opposite side of the tube shown in FIG. 4 having a relatively small hole drilled therein and coaxial to the hole shown in FIG. 4;

FIG. 6 is a sectional view showing the tube portion of FIG. 4 having a relatively larger hole therein;

FIG. 7 is a sectional view showing the tube portion of FIG. 5 having a larger hole drilled partially therein coaxially with the smaller hole;

FIG. 8 is a sectional view of the entire tube of which portions are shown in FIGS. 6 and 7, the hole shown in FIG. 6 being plugged.

DETAILED DESCRIPTION OF THE INVENTION

Figure 1:
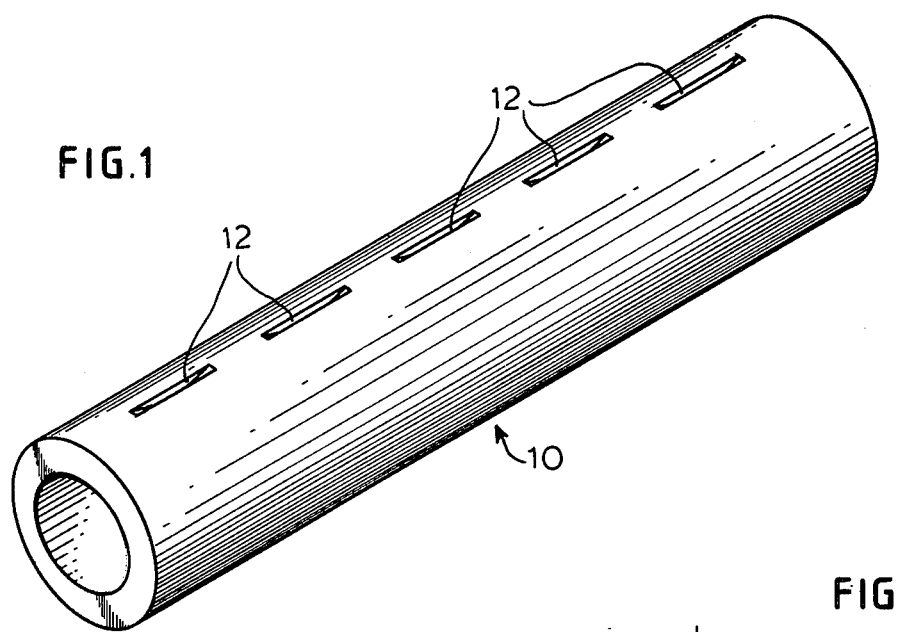
FIG. 1 is a perspective view of a water header including a plurality of spray openings formed therein.
Figure 3:
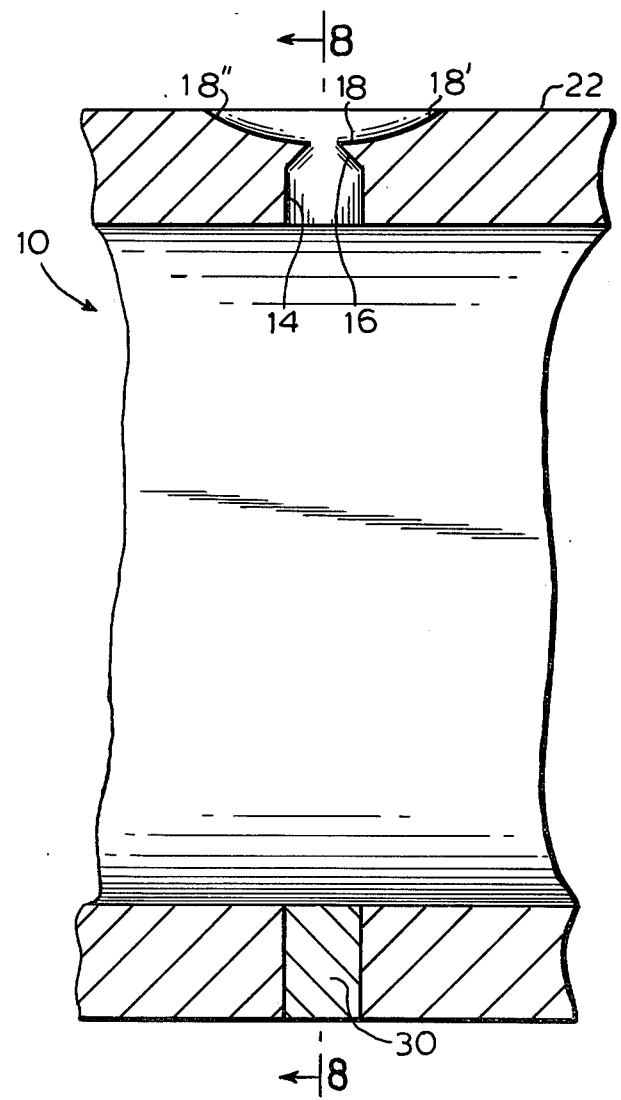
FIG. 3 is a sectional view taken along the plane of line 3—3 of FIG. 2.
Figure 2:
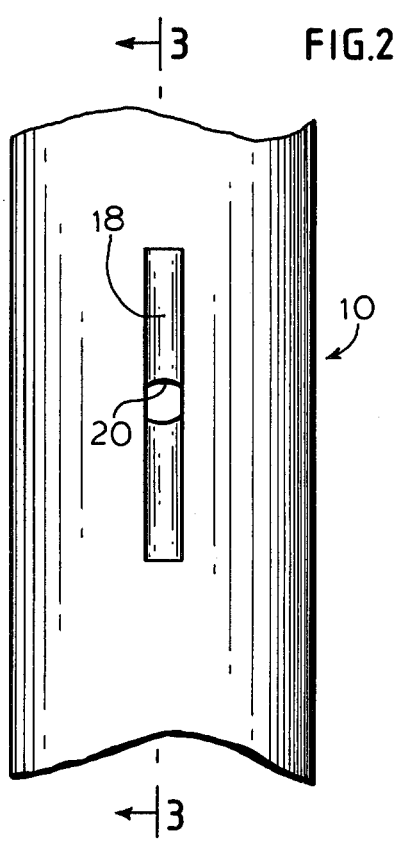
FIG. 2 is a plan view of a portion of the water header shown in FIG. 1.

A water header comprising a stainless steel tube 10 of circular cross section and a plurality of integrally formed spray nozzles 12 is shown in FIG. 1. Each of the spray nozzles is designed to produce a well defined fan spray pattern. Since they are identical, they will be described by reference to only one such nozzle as shown in FIGS. 2, 3 and 8.

Each spray nozzle 12 includes a relatively large cylindrical passage 14 which opens into the interior of the tube 10. The large passage then tapers inwardly to form a conical area 16 defined by the walls of the tube. The cross sectional diameter of the conical portion decreases in the direction of the exterior surface of the tube. Both the cylindrical passage 14 and the conical portion 16 are coaxial, their axes intersecting the longitudinal axis of the tube 10.

An arcuate groove 18 is cut into the exterior surface of the tube 10. The groove 18 has a length running parallel to the longitudinal axis of the tube and a uniform width which is smaller than the diameter of the relatively large passage 14. The deepest portion of groove 18 intersects the conical area 16 such that a spray opening 20 is formed in the exterior surface of the tube. The maximum groove depth should be less than the distance between the cylindrical outer wall 22 and the radially outermost portion of the cylindrical passage 14. The length and width dimensions of opening 20 will be relatively small in comparison to the length of the groove.

The steps taken in the manufacture of the nozzle 12 are shown in FIGS. 4-8. A hole is first drilled through the entire tube 10 such that opposing passages 24, 26 of a relatively small diameter are formed. The passages are coaxial and are normal to the exterior and interior surfaces of the tube 10 as shown in FIGS. 4 and 5.

A drill having a larger bit 27 is employed after passages 24, 26 have been formed. Drilling is conducted along the respective axes of the passages 24, 26 from one side of the tube into the other. Passage 24 is uniformly enlarged to form a first passage 28 having a relatively large diameter. The bit 27 proceeds through the hollow interior of the tube and then contacts the interior surface on the opposite side thereof. It penetrates the wall of the tube from the interior towards the exterior. The drilling is stopped before the wall opposite passage 28 is fully penetrated. Due to the shape of the bit, the cylindrical passage 14 and conical area 16 are formed as shown in FIG. 7.

Using a grinding wheel or the like, the groove 18 is then formed to the above described dimensions. The groove is symmetrical and the end portions 18', 18" thereof form a smooth transition with the exterior walls of the tube 10.

The passage 28 opposite the spray nozzle 12 is finally plugged by means of an appropriate filler 30 as shown in FIG. 8. The plug surfaces are then machined so that they form a smooth transition with the tube walls. Welding or soldering operations may be employed in the plugging of the passage 28.

In operation, pressure within the tube 10 causes water to be sprayed from one or more nozzles 12 in desirable spray patterns. There are no areas where bacteria can accummulate making the nozzles safe for any operation where such spray patterns are desired. In the embodiment described above, the wall of the tube is about 3/16 inches thick and the length of the groove is about 9/16 inches. The inner diameter of the tube is approximately 11/16 inches. It will be appreciated that the invention could be practiced using other dimensions depending on the size of the tube and the diameters of the holes drilled therein.

What is claimed is:

1. A method for manufacturing a fan spray nozzle comprising the steps of:

providing a substantially cylindrical tube having interior and exterior surfaces;

drilling a first pair of coaxial, diametrically opposed holes of relatively small diameter through the walls of said tube;

enlarging the diameter of one of said diametrically opposed holes by drilling coaxially therethrough with a drill bit having a larger diameter than the diameter of said diametrically opposed holes;

enlarging the diameter of a portion of the other of said diametrically opposed holes by passing said drill bit through said one hole and the interior of said tube until it contacts the interior surface defining an interior opening of said other hole, drilling along the axis of said other hole, and stopping said drilling before said bit fully penetrates the exterior surface of said tube such that said other hole includes a first cylindrical hole portion extending within the walls of said tube from the interior surface thereof to a point between said interior surface and said exterior surface and a second hole portion of lesser diameter than said first hole portion extending from said point to said exterior surface;

grinding an arcuate groove within the walls of said tube, said groove extending below the exterior surface of said tube and intersecting said other hole at a depth which is between the exterior surface of said tube and said point, said groove being ground to have a length dimension substantially parallel to the longitudinal axis of said tube; and plugging said one of said diametrically opposed holes after the enlarging thereof, whereby water provided under pressure to the cylindrical tube is dispersed in a predetermined pattern.

2. A method as defined in claim 1 wherein said groove is formed to have a width smaller than the diameter of said first cylindrical hole portion of said other hole.

* * * * *